United States Patent
Balinzo et al.

(10) Patent No.: US 12,137,044 B2
(45) Date of Patent: Nov. 5, 2024

(54) METHOD FOR DETECTING SYSTEMATIC COMMUNICATIONS IN A COMMUNICATIONS NETWORK, CORRESPONDING DEVICE, AND COMPUTER PROGRAM PRODUCT

(71) Applicant: Aizoon S.r.l., Turin (IT)

(72) Inventors: Dario Balinzo, Turin (IT); Stefano Imperiale, Turin (IT); Daniele Ucci, Turin (IT); Riccardo Cardiello, Turin (IT)

(73) Assignee: Aizoon S.r.l., Turin (IT)

( * ) Notice: Subject to any disclaimer, the term of this patent is extended or adjusted under 35 U.S.C. 154(b) by 372 days.

(21) Appl. No.: 17/730,273

(22) Filed: Apr. 27, 2022

(65) Prior Publication Data

US 2022/0353169 A1 Nov. 3, 2022

(30) Foreign Application Priority Data

May 3, 2021 (IT) .......................... 102021000011267

(51) Int. Cl.
*H04L 43/50* (2022.01)
*H04L 9/40* (2022.01)
*H04L 43/0852* (2022.01)
*H04L 69/22* (2022.01)

(52) U.S. Cl.
CPC .......... *H04L 43/50* (2013.01); *H04L 43/0852* (2013.01); *H04L 63/205* (2013.01); *H04L 69/22* (2013.01)

(58) Field of Classification Search
CPC ... H04L 43/50; H04L 43/0852; H04L 63/205; H04L 69/22; H04L 43/087;
(Continued)

(56) References Cited

U.S. PATENT DOCUMENTS 8,578,493 B1 * 11/2013 Cowan .................. G06F 21/554
709/224
2016/0261616 A1 * 9/2016 Shulman ................. H04L 63/10
(Continued)

OTHER PUBLICATIONS

Hubballi et al. "Flow Summary: Summarizing Network Flows for Communication Periodicity Detection", Advances in Biometrics: International Conference, Seoul, Korea, pp. 695-700, Aug. 27-29, 2007.

(Continued)

*Primary Examiner* — Will W Lin
(74) *Attorney, Agent, or Firm* — Nixon & Vanderhye P.C.

(57) ABSTRACT

Described herein is a method for detecting systematic communications in a communications network (10, 30). The method comprises repeating the following steps for each data packet (DP) of a sequence of a plurality of data packets (DP) sent through the communication network (10, 30) from a respective source to a respective destination:
obtaining (1002, 1004) metadata (MD) of the data packet (DP), wherein the metadata (MD) include both data that identify the source and/or the destination and data that identify a sending time (t) when the data packet (DP) has been sent;
verifying (1022) whether the data packet (DP) belongs to a specific type of communication by checking whether the metadata (MD) indicate the fact that the data packet (DP) has been sent by a given source and/or received by a given destination, and in the case where the metadata (MD) indicate that the data packet (DP) has been sent by a given source and/or is received by a given destination, computing (1024) a value of variance for the given type of communication; and
comparing (1012) the value of variance with a threshold (TH), and in the case where the value of variance is less than
(Continued)

the threshold, generating (1014) a notification that indicates the fact that the given type of communication is systematic. In particular, the value of variance is calculated by means of an iterative procedure.

10 Claims, 5 Drawing Sheets

(58) Field of Classification Search
CPC . H04L 63/0236; H04L 41/16; H04L 63/1425; H04L 43/026; H04L 43/028; H04L 43/062; H04L 43/12; H04L 41/142
See application file for complete search history.

(56) References Cited

U.S. PATENT DOCUMENTS

| | | | |
|---|---|---|---|
| 2018/0276376 A1* | 9/2018 | Lim | H04L 63/1425 |
| 2019/0280983 A1* | 9/2019 | Thubert | H04L 47/283 |
| 2021/0243208 A1* | 8/2021 | Rubin | G06F 21/552 |
| 2021/0266748 A1* | 8/2021 | Wei | H04W 12/69 |

OTHER PUBLICATIONS

Pébay et al. "Numerically stable, scalable formulas for parallel and online computation of higher-order multivariate central moments with arbitrary weights", Computational Statistics, vol. 31, No. 4, pp. 1305-1325, Mar. 29, 2016.

Haffey et al. "Modeling, Analysis, and Characterization of Periodic Traffic on a Campus Edge Network", 2018 IEEE 26$^{th}$ International Symposium on Modeling, Analysis, and Simulation of Computer and Telecommunication Systems, pp. 170-182, Sep. 25, 2018.

Extended European Search Report for Application No. 22167017.7, nine pages, dated Sep. 15, 2022.

Italian Search Report with English Translation for Application No. IT 202100011267, 12 pages, dated Jan. 18, 2022.

* cited by examiner

FIG. 5

| i | t | D | $s_{sp}$ | $s_{sq}$ | Var |
|---|---|---|---|---|---|
| 0 | 251 | [[251,0]] | 0 | 0 | 0 |
| 1 | 450 | [[251,0],[450,199]] | 199 | 39,601 | 0 |
| 2 | 678 | [[251,0],[450,199],[678,228]] | 427 | 91,585 | 210.25 |
| ... | ... | ... | ... | ... | ... |
| 8 | 602 | [[251, 0], [450, 199], [553, 103], [602, 49], [660, 58], [678, 18],[719, 41], [824, 105], [876, 52]] | 625 | 71,709 | 2840.11 |
| 9 | 184 | [[184, 0], [251, 67], [450, 199], [553, 103], [602, 49], [660, 58], [678, 18],[719, 41], [824, 105], [876, 52]] | 692 | 76,198 | 2554.54 |

METHOD FOR DETECTING SYSTEMATIC COMMUNICATIONS IN A COMMUNICATIONS NETWORK, CORRESPONDING DEVICE, AND COMPUTER PROGRAM PRODUCT

CROSS REFERENCE TO RELATED APPLICATIONS

This application claims priority to and incorporates by reference the entirety of Italian Patent Application Number 10 2021 0000 11267, filed May 3, 2021.

TECHNICAL FIELD

The embodiments of the present description regard techniques for data-packet analysis implemented, in particular, within one or more computers forming part of a network-security monitoring platform (NSMP), also identified as Security Network Monitoring Platform (SNMP).

BACKGROUND

FIG. 1 shows a typical communications system. In the example considered, the system comprises a router 20 configured for exchanging data between a local-area network (LAN) 10 and a wide-area network (WAN) 30, such as the Internet. For this purpose, the router 20 has an interface configured for communication with the WAN 30. This interface may be, inter alia:
- a DSL (Digital Subscriber Line) modem,
- a mobile communication interface, such as a transceiver of a GSM (Global System for Mobile Communications) type, a CDMA (Code-Division Multiple Access) type, a W-CDMA (Wideband Code-Division Multiple Access) type, a UMTS (Universal Mobile Telecommunications System) type, an HSPA (High-Speed Packet Access) type and/or an LTE (Long Term Evolution) type,
- an Ethernet communication interface (copper and/or optical fibre), and/or
- a Wi-Fi communication interface, compatible with one of the versions of the IEEE 802.11 standard.

Typically, the router 20 further comprises one or more communication interfaces for connection to the LAN 10. For example, in FIG. 1, the LAN 10 is a wired network formed by one or more switches 100, constituted for example by Ethernet ports for copper wires (typically RJ45 wires) and/or optical fibres. Consequently, one or more local clients DEV may be connected to the LAN 10 through one or more switches 100. For example, FIG. 1 shows a fixed computer DEV1 and a notebook DEV2, i.e., computers with a wired network card. In general, the LAN 10 may also comprise wireless devices, which are capable of communicating with one another and with the WAN 30, for example, via Wi-Fi. In this case, the LAN 10 envisages one or more access points 102, which are connected to one or more switches 100. For example, FIG. 1 shows a local client DEV3, which could be either a notebook or a tablet, i.e., a computer with a wireless network card. The data exchange between the various devices of the network may occur using various protocols. For example, frequently data exchange between two devices occurs via the Internet Protocol (IP). The various details of the IP protocol and of the various layers of the network protocols are well known to the person skilled in the art. Consequently, the local clients DEV may access at least one from among:
- a local server SRVL connected to the LAN 10;
- a remote server SRVR connected to the WAN 30; and
- a server SRVDMZ connected to a so-called demilitarized zone (DMZ) managed by the router 20.

Of course, the person skilled in the art will note that modern computer networks may be much more complex. In fact, the LAN 10 could also be formed by a very large number of local clients DEV, servers SRV and/or SRVDMZ, and further components of the infrastructure of the LAN 10 (for example, switches 100 and/or access points 102, routers 20, etc.). Moreover, the LAN may also comprise a plurality of LAN subnetworks, e.g., connected through a Virtual Private Network (VPN). Again, in order to improve network security, one or more of the devices may be configured as firewalls or, in general, may carry out functions of filtering of the data packets: for example, the switch 100, the access point 102, and the router 20 can implement filtering functions, while the server SRVL and/or the server SRVDMZ can function as firewall.

To improve network security further, modern computer networks frequently rely upon antivirus software, installed on the various computers (DEV, SRVL and/or SRVDMZ). The antivirus software typically monitors the programs that are downloaded and executed by a computer but, also, the traffic generated by the corresponding computer, for the protocols HTTP (Hypertext Transfer Protocol), HTTPS (HyperText Transfer Protocol over Secure Socket Layer/Transport Layer Security), POP (Post Office Protocol), in particular in its version 3 (POP3), IMAP (Internet Message Access Protocol), SMTP (Simple Mail Transfer Protocol), SMB (Server Message Block), etc.

Recently, networks have been enriched with network-security monitoring platforms (NSMP), also identified as Security Network Monitoring Platform (SNMP), which collect, treat, and process data flows observed in near-real time for identifying possible cyber-attacks or anomalous behaviours in the network being monitored, such as the LAN 10 and/or the DMZ.

In particular, as shown in FIG. 1, an SNMP comprises at least one computer 400. This computer 400 receives from various data-traffic sensors a copy of the data that are exchanged between different devices. Consequently, from an analysis of the data exchange, the computer 400 can detect any possible anomalous behaviours. For example, as shown in FIG. 1, these data-traffic sensors may be implemented with at least one of the following:
- a port of a so-called Switched Port Analyzer (SPAN) type, or one of its variants, such as Remote SPAN (RSPAN), Port-based SPAN (PSPAN), or VLAN-based SPAN (VSPAN), in which a managed switch 100 is configured to send a copy of the traffic exchanged through the switch 100 to the computer 400;
- a router 20 (or a firewall) configured to send a copy of the traffic exchanged through the router 20 (or the firewall) to the computer 400; or
- a dedicated passive or active terminal access point (TAP) 404 configured to send a copy of the traffic that passes through the TAP 404 to the computer 400.

Frequently, these data-traffic sensors do not necessarily send a copy of all the traffic, but may send:
- a copy of the traffic that meets given rules, for example with reference to the source port and/or destination port of the switch 100, to the source and/or destination IP address, to the TCP or UDP port, to the higher-layer protocol used, such as HTTP, etc.; and/or pre-processed data, wherein the sensor has already extracted some features from the data traffic, the so-called metadata.

Consequently, the computer 400 receives a copy of the traffic containing data and/or metadata that can be analysed to determine any possible anomalous behaviours. For example, the present applicant markets an SNMP platform with the name Aramis®.

An SNMP can incorporate various software components or modules that analyse, in parallel, the various features of the data traffic.

Amongst other things, in the simplest case, a component may verify whether within the data or the metadata of the traffic being monitored there are no indicators of compromise (IoCs) and/or signatures that may be correlated to malicious activities. For example, these IoCs and/or malicious signatures may be downloaded from a remote server SRVR connected to the WAN 30, such as public or proprietary sources. For instance, in the simplest case, the above IoCs may correspond to given predetermined rules, such as IP addresses and/or URLs (Uniform Resource Locators) of websites that distribute malware. On the other hand, the signatures may be used, in a way similar to a traditional antivirus, for comparing the signature of a file downloaded (for example with the protocol HTTP, POP or IMAP) with a list of signatures of malicious files. For example, these file signatures may be calculated with a hash function, such as MD5, SHA-1, SHA-2 (for example SHA-256) or SHA-3.

Recently, machine learning has been applied also in the field of cyber security in order to analyse the network traffic and detect automatically any behaviours that deviate from the normal and legitimate behaviour of the network, i.e., any behaviours that may be indicators of anomalies and/or malicious activities. For example, a machine-learning component may use one or more mathematical models with a supervised or non-supervised approach for modelling the normal behaviour of each computer DEV and/or server SRVL/SRVDMZ within the LAN 10 and/or the DMZ. Some solutions also enable monitoring of sets of devices, for example all the clients DEV that exchange traffic with the WAN. In general, for the supervised approaches, training of the models may be carried out during specific steps, on request, and/or periodically. Hence, once the mathematical model has been trained, this model may be used for classifying the current behaviour of the data exchange in the network being monitored. Consequently, whereas the first component is deterministic, the machine-learning component automatically adapts to the behaviour of a given network.

Moreover, another component may detect more complex anomalous behaviours by analysing the traffic through more sophisticated advanced analytics referred to as Advanced Cybersecurity Analytics (ACA). The purpose of these analytics is hence to identify sequences of suspect events that with a certain likelihood may be correlated to the phases of an attack. These analytics are typically based on the mathematical modelling of malicious behaviours through statistical and/or machine-learning approaches.

Use of the above three components makes it possible to alert an operator, i.e., a so-called security analyst, in a timely way in the event of an anomaly or attack, for example through the use of display of targeted graphic information and/or by sending notifications to the operator. For example, for this purpose, the computer 400 may be connected to one or more analysis terminals 406. In general, whereas FIG. 1 shows direct connections between the data-traffic sensors 20, 402, 404 and the computer 400, and between the computer 400 and the terminal 406, in the practice, this connection may be implemented via the LAN 10 and/or preferably via a dedicated network. Furthermore, as mentioned previously, the platform 400 could also comprise a number of computers that implement different components and/or analyse different traffic.

Consequently, a network-security monitoring platform provides a set of analytics, capable of identifying suspect events that can be put down to an attack.

In this context, irrespective of whether deterministic, probabilistic, and/or machine-learning methods are used, some analytics have the purpose of detecting automatic and systematic communications performed by malware.

SUMMARY

The present disclosure hence relates to solutions for detecting systematic, i.e., repetitive and/or periodic, communications that may be an indicator of the presence of malware within the network being monitored. According to one or more embodiments, the above object is achieved through a method having the distinctive elements set forth specifically in the ensuing claims. The embodiments moreover regard a corresponding device, as well as a corresponding computer program product, which can be loaded into the memory of at least one computer and comprises portions of software code for implementing the steps of the method when the product is run on a computer. As used herein, reference to such a computer program product is understood as being equivalent to reference to a computer-readable means containing instructions for controlling a processing system in order to co-ordinate execution of the method. Reference to "at least one computer" is clearly intended to highlight the possibility of the present disclosure being implemented in a distributed/modular way.

The claims form an integral part of the technical teaching of the description provided herein.

As mentioned previously, various embodiments of the present disclosure regard a method and a corresponding SNMP for detecting systematic communications in a communications network. In particular, the SNMP is configured for repeating a series of operations, for each data packet—of a sequence of a plurality of data packets—sent through the communications network from a respective source to a respective destination.

In particular, in various embodiments, the SNMP obtains metadata of the data packet, where the metadata include both data that identify the source and/or the destination and data that identify a sending time t when the data packet has been sent.

In various embodiments, the SNMP then verifies whether the data packet belongs to a specific type of communication by checking whether the metadata indicate the fact that the data packet has been sent by a given source and/or received by a given destination. For example, for this purpose, the SNMP may verify whether the data packet: has been sent from a given IP source address to a given IP destination address or to a given destination port; is an ARP (Address Resolution Protocol) request sent from a MAC source address and/or from an IP source address, or is an ICMP (Internet Control Message Protocol) echo request sent from a MAC source address and/or from an IP source address.

In various embodiments, the SNMP then calculates a value of variance for the given type of communication, compares the value of variance with a threshold, and possibly generates a notification that indicates the fact that the given type of communication is systematic.

In particular, in various embodiments, the SNMP uses an iterative approach for calculating the value of variance. In particular, as will be described in greater detail hereinafter, the SNMP may manage for this purpose an orderly list for storing the sending times t, and can compute the value of variance as a function of a quadratic sum, the difference between the sending time of the last element of the orderly list and the sending time of the first element of the orderly list, and the number of elements present in the orderly list.

In particular, in various embodiments, once the metadata of the data packet have been obtained, and in particular the sending time t of the respective data packet, the SNMP verifies whether the orderly list is empty. In the case where the orderly list is empty, the SNMP adds the sending time t as first element of the orderly list, and sets the value of a quadratic sum to zero. Instead, in the case where the orderly list is not empty, the SNMP compares the sending time with the sending times stored in the orderly list.

In particular, in various embodiments, in the case where the sending time t is greater than the sending time of the last element in the orderly list, the SNMP computes the difference between the sending time t and the sending time of the last element of the orderly list. Moreover, the SNMP updates both the orderly list by adding the sending time t as new last element at the end of the orderly list and the value of the quadratic sum by adding the square of the difference.

Instead, in the case where the sending time t is less than the sending time of the first element in the orderly list, the SNMP computes the difference between the sending time of the first element of the orderly list and the sending time t. Moreover, the SNMP updates both the orderly list by adding the sending time t as new first element at the beginning of the orderly list and the value of the quadratic sum by adding the square of the difference.

Finally, in the case where the sending time t is greater than the sending time of the first element in the orderly list and less than the sending time of the last element in the orderly list, the SNMP determines a position j for entry of the sending time t. This position j corresponds to the position of the element in the orderly list that has a sending time greater than the sending time t and less than the sending time of the immediately preceding element. The SNMP then computes a first difference between the sending time of the element of the orderly list in position j and the sending time t. Next, the platform computes a second difference between the sending time t and the sending time of the element of the orderly list in the position that precedes the position j. Finally, the SNMP determines a third difference between the sending time of the element of the orderly list in position j and the sending time of the element of the orderly list in the position that precedes the position j.

For example, the SNMP may calculate the third difference by computing the difference between the sending time stored in the element of the orderly list in position j and the sending time stored in the element of the orderly list in the position that precedes the position j.

Alternatively, to determine the various differences, the SNMP can store the differences in a list. In particular, in the case where the sending time t is greater than the sending time of the last element in the orderly list, the SNMP may store the difference between the sending time t and the sending time of the last element of the orderly list with the new last element of the updated orderly list. Instead, in the case where the sending time t is less than the sending time of the first element in the orderly list, the SNMP may store the difference between the sending time of the first element of the orderly list and the sending time t with the old first element of the (non-updated) orderly list. Consequently, in the case where the sending time t is greater than the sending time of the first element in the orderly list and less than the sending time of the last element in the orderly list, the SNMP may obtain the third difference by reading the difference stored in the element of the orderly list in position j. However, in this case, the SNMP stores the second difference in the new element of the updated orderly list in position j, and stores the first difference as difference of the old element of the orderly list in position j.

Moreover, in the case where the sending time t is greater than the sending time of the first element in the orderly list and less than the sending time of the last element in the orderly list, the SNMP updates the orderly list by adding the sending time t as new element in the position j of the orderly list and updates the value of the quadratic sum by adding the square of the first difference and the square of the second difference and subtracting the square of the third difference.

In various embodiments, the SNMP is moreover able to determine the number of elements present in the orderly list and compute the difference between the sending times contained in the last element and in the first element of the updated orderly list. Finally, the SNMP computes the value of variance as a function of the quadratic sum, the difference, and the number of elements.

For example, to determine the difference between the sending time of the last element of the updated orderly list and the sending time of the first element of the updated orderly list, the SNMP can increment sequentially a partial sum. In particular, in the case where the orderly list is empty, the SNMP can set the value of the partial sum to zero. In the case where the sending time t is greater than the sending time of the last element in the orderly list, the SNMP can update the value of the partial sum by adding the difference between the sending time t and the sending time of the last element of the orderly list. Instead, in the case where the sending time t is less than the sending time of the first element in the orderly list, the SNMP can update the value of the partial sum by adding the difference between the sending time of the first element of the orderly list and the sending time t.

BRIEF DESCRIPTION OF THE FIGURES

The embodiments of the present disclosure will now be described with reference to the annexed drawings, which are provided purely by way of non-limiting example, and in which:

FIGS. 5, 6A, 6B, 6C, 6D, and 6E show details of operation of the platform of FIGS. 3 and 4.

DETAILED DESCRIPTION

In the ensuing description, numerous specific details are provided to enable an in-depth understanding of the embodiments. The embodiments may be implemented without one or more of the specific details, or with other methods, components, materials, etc. In other cases, operations, materials or structures that are well known are not represented or described in detail so that the aspects of the embodiments will not be obscured.

Reference throughout this description to "an embodiment" or "one embodiment" means that a particular characteristic, distinctive element, or structure described with reference to the embodiment is comprised in at least one embodiment. Hence, the use of the phrase "in an embodiment" or "in one embodiment" in various parts of this description do not necessarily refer all to one and the same embodiment. Moreover, the particular characteristics, the distinctive elements, or the structures may be combined in any way in one or more embodiments.

The references appearing herein are provided only for convenience and do not define the sphere of protection or the scope of the embodiments.

Figure 1:
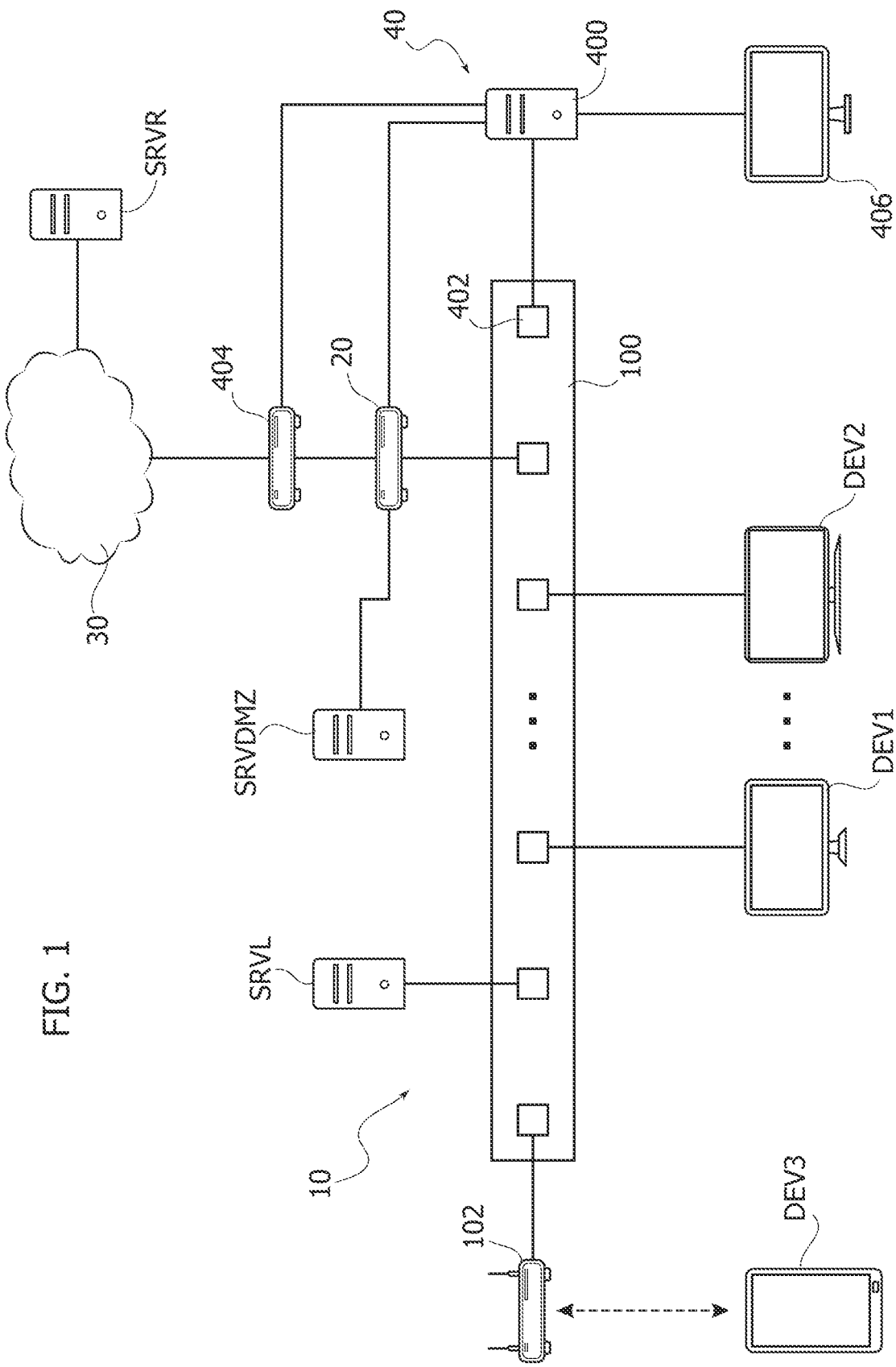
FIG. 1 shows an example of a communications system comprising a network-security monitoring platform.

In the ensuing FIGS. 2 to 5, the parts, elements, or components that have already been described with reference to FIG. 1 are designated by the same references as those used previously in this figure; the description of these elements that have been described previously will not be repeated hereinafter in order not to overburden the present detailed description.

As mentioned previously, the present disclosure provides solutions for detecting systematic communications, which may be an indicator of the presence of malware. In fact, unlike human behaviour, the communications made by malicious software may be characterized by a low latency and a marked periodicity.

Figure 2:
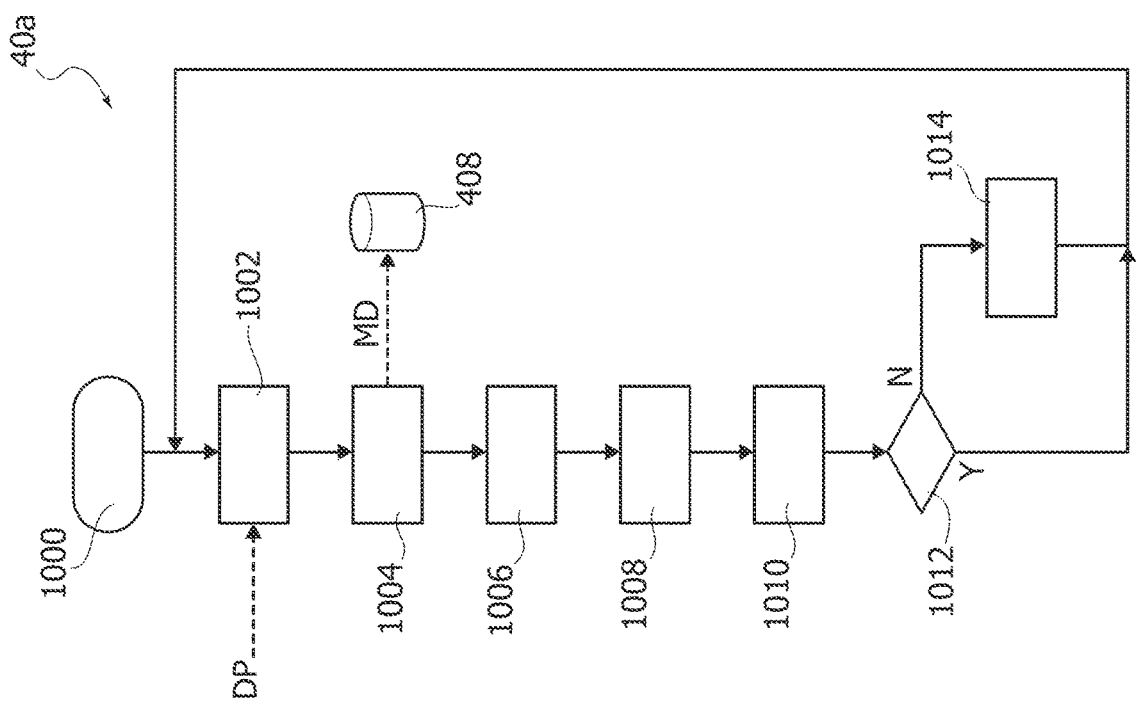
FIG. 2 shows a first embodiment of operation of a network-security monitoring platform, where the platform computes a value of variance.

FIG. 2 shows a first embodiment of a method for detecting systematic communications. For example, this method can be implemented within a computer 40a configured for implementing a network-security monitoring platform (NSMP), also identified as Security Network Monitoring Platform (SNMP), for example via software code and/or hardware components. For a general description of such an SNMP platform, reference may be made to the description of FIG. 1.

After a starting step 1000, the computer 40a receives in a step 1002 data packets DP from one or more data-traffic sensors. For example, as explained previously, these data packets DP may be supplied by a SPAN port 402 of a switch 100, a router and/or a firewall 20, a TAP 404, etc. In general, the computer 40a may also be integrated directly in one of the data-traffic sensors, for example within a firewall with a sufficient computational capacity.

For example, with reference to data packets DP compliant with the IP (Internet Protocol), each IP (IPv4 or IPv6) packet comprises an IP source address and an IP destination address. Moreover, each IP packet may comprise:

ICMP (Internet Control Message Protocol) control data; or data of a transport protocol, which comprises a payload and possibly further routing information, for example a TCP (Transmission Control Protocol) or the UDP (User Datagram Protocol) port.

In general, the data packets DP may even be data packets at the level of network access (link layer), for example, directly the respective Ethernet frames or requests compliant with the Address Resolution Protocol (ARP). For instance, with reference to the ARP, an ARP request makes it possible to obtain the MAC (Media Access Control) address associated to a given IP address. Consequently, in general, each data packet DP typically comprises the data that identify the source of the data packet DP, for example the MAC address and/or the IP address.

Consequently, in a step 1004, the computer 40a may process the data packet DP and extract data characterizing the data packet DP. For example, a typical data packet DP may comprise, in addition to the Ethernet and/or IP headers, also a header at the level of transport protocol, such as TCP or UDP. Consequently, in various embodiments, the computer 40a may extract from these headers routing information, such as:

in the case where the data packet DP is included in an Ethernet frame, the MAC source address and possibly the MAC destination address;

in the case where the data packet DP comprises an IP packet (possibly included in an Ethernet frame), the IP source address and the IP destination address; and in the case where the data packet DP comprises a TCP or UDP packet (possibly included in an IP packet), the respective port.

In various embodiments, the computer 40a may also extract other information from the header or headers of the data packet DP. For instance, in various embodiments, the computer 40a is configured to classify the data packets as ICMP, ARP messages, or data transmissions.

In various embodiments, the computer 40a may also process the payload of the data packet DP. For example, in various embodiments, the computer 40a may calculate a signature (e.g., a hash code) for the payload.

These characteristic data correspond thus to metadata MD that describe the data packet DP. For instance, the computer 40a may store the above metadata MD in a memory 408, for example implemented with a database. In general, the database 408 may be implemented by the computer 408 itself or by one or more further computers.

In particular, in various embodiments, the metadata MD also comprise a timestamp t. For example, for this purpose, the computer 40a may be configured with a so-called real-time clock (RTC). Consequently, when the computer 40a receives a data packet DP, the computer 40a itself may obtain the instant of reception from the RTC and store this value along with the metadata MD for the aforesaid data packet DP. Consequently, in general, the computer may associate to each data packet DP a respective time in which communication of the respective packet DP occurs.

In general, as explained previously, the data-traffic sensors may already process the data packets DP and generate (at least in part) the metadata MD; i.e., the computer 40a could receive in step 1002 directly metadata MD, and optionally also the respective data packets DP or only the respective payload. In this case, the computer 40a could even only store in step 1004 the metadata MD received.

In various embodiments, the computer 40a then determines in a step 1006 an orderly timestamp sequence T $T:=[t_0, t_1, \ldots, t_{(n-1)}]$ where a timestamp $t_i$ is the instant in time at position i corresponding to communication of the respective data packet DP.

In particular, the computer 40a is configured for determining the sequence T for a given type of communication, such as ARP requests that comprise one and the same MAC source address, an ICMP echo request (the so-called ping), IP packets that comprise one and the same IP source address, etc. Consequently, for this purpose, the computer 40a may be configured for:

managing a plurality of sequences T, where each sequence T is associated to a respective rule for the metadata MD; and determining whether the metadata MD of the last data packet $DP_{(n-1)}$ processed correspond to one of the rules and, if they do, adding the respective timestamp t, associated to the last data packet $DP_{(n-1)}$ to the respective sequence T.

In particular, considering that the data packets DP may have different dimensions, and/or may be processed by different computers or different processors of one and the same computer, processing of the data packets DP may require a different processing time. Furthermore, the data-traffic sensors may send the data with different propagation times. For this reason, the timestamp $t_i$ of the last data packet $DP_{(n-1)}$ processed does not necessarily correspond to the last element $t_{(n-1)}$ of the orderly sequence T, but the computer 40a is configured for inserting the timestamp in the sequence T in a position j, with $0 \le j \le (n-1)$, in such a way that the sequence T is ordered.

Consequently, in various embodiments, the computer 40a may manage different sequences T for different source and/or destination addresses (e.g., MAC and/or IP addresses), and possibly different sequences T for the same source, for example with reference to the protocol used, etc.

For instance, to detect a so-called LAN scan, the computer 40a may be configured for managing a respective sequence T for at least one from among:

ARP requests sent by the same source;
ICMP echo requests sent by the same source; and
TCP or UDP requests for connection to a given port sent by the same source.

For example, in various embodiments, the source is identified via the respective MAC address or IP address, or the combination of the respective MAC address and IP address. Consequently, in this way, it is possible to monitor communications sent by the same source that are able to detect other computers that can be reached within the LAN 10.

Instead, to detect a so-called port scan of the same destination, the computer 40a may be configured for managing a respective sequence T for TCP or UDP connection requests sent from the same source to the same destination. For example, the source and the destination may be identified via the respective MAC address and/or IP address.

Moreover, to detect brute-force attacks carried out to obtain an unauthorized access to a computer, the computer 40a may be configured for managing a respective sequence T of authentication requests between the same source and the same destination, such as authentication requests in accordance with the protocols POP3, SMTP, IMAP, HTTP, HTTPS, and/or SMB.

In general, the computer 40a could also enable specification of additional rules, for example through the terminal 406. For instance, in various embodiments, these rules may comprise one or more of the metadata MD.

In the embodiment considered, the computer 40a then computes in a step 1008 the difference between each timestamp and the previous timestamp, thus determining a sequence S:

$$S := [t_1-t_0, t_2-t_1, \ldots, t_{(n-1)}-t_{(n-2)}] = [S_0, S_1, \ldots, S_{(n-2)}]$$

In general, in the case where the computer 40a manages a number of sequences T, the computer 40a computes for each sequence T a respective sequence S.

In various embodiments, to determine the periodicity of the communication, the computer 40a computes in a step 1010 the variance Var(S) of each sequence S; namely, $$\mathrm{Var}(S) = \frac{1}{n-1} \sum_{i=0}^{n-2} (s_i - \overline{S})^2$$

where $\overline{S}$ corresponds to the arithmetic mean of the values of the sequence S.

Consequently, in a step 1012, the computer 40a may verify the value of the variance Var(S) of each sequence S. In particular, in the case of automatic requests, the variance Var(S) should be low.

Consequently, in the case where the value of the variance Var(S) of a sequence S is less than a threshold TH (output "N" from the verification step 1012), the computer 40a proceeds to a step 1014, where it notifies the event to an operator, for example by sending a notification to the terminal 406 (see FIG. 1). Next, the computer 40a returns to step 1002 to receive a next data packet DP and/or metadata MD.

Instead, in the case where the value of the variance Var(S) of all the sequences S is greater than the threshold TH (output "Y" from the verification step 1012), the computer 40a may return directly to step 1002 to receive the next data packet DP and/or metadata MD.

In various embodiments, the threshold TH for each sequence S may be fixed, programmable, or determined by analysing the communications made in the absence of malware. For example, for this purpose, the computer 40a may calculate, during a training step and/or periodically, a value of variance Var(S) (as described with reference to steps 1006-1010) for a sequence S and calculate the threshold TH by multiplying the aforesaid value by a coefficient c, i.e., $TH = c \cdot Var(S)$, with $c<1$, for example $c=0.8$.

In general, the computer 40a may also use statistical approaches. For example, in the simplest case, the computer 40a may monitor in time different sequences S, choose the minimum value $Var_{min}(S)$, and calculate the threshold TH by multiplying the aforesaid minimum value $Var_{min}(S)$ by the coefficient c.

In general, the threshold TH may be determined also via a machine-learning algorithm. For instance, in this case, a machine-learning algorithm, such as a neural network, may be trained for predicting an expected variance for a certain period of time of a given day of the week. Consequently, the mathematical model (for example, the trained neural network) receives as input the time and a datum that identifies the day of the week and supplies as output an estimate of the expected variance. Hence, the threshold TH may be calculated by multiplying the above expected variance by the coefficient c.

Consequently, in various embodiments, the computer 40a may store one or more values of variance Var erasing each time the elements of the orderly list T, and determine the threshold TH as a function of this value or these values of variance Var. In particular, for this purpose, the elements may be erased explicitly from the orderly list or implicitly by generating a new orderly list.

Consequently, through calculation of the variance, the computer 40a is able to detect the communications that occur in a systematic way. However, as explained previously, the computer 40a may even manage numerous sequences T for the various types of communications to be monitored. Moreover, each sequence T may comprise an even extremely large number of elements. Consequently, calculation of the values of the mean S and the variance Var(S) in real time may become complex.

The inventors have noted that the computational time could be reduced using an iterative calculation scheme for the variance. However, this is not easy to apply to the sequence S, since the timestamps of the data packets DP received/processed may be out of order, which would also affect the sequence of differences S.

Figure 3:
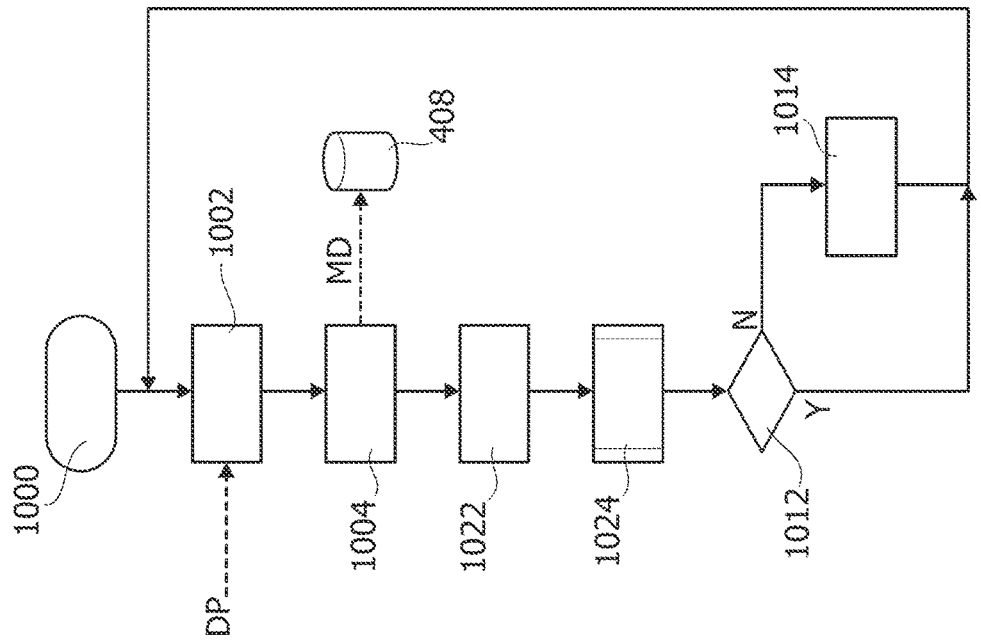
FIGS. 3 and 4 show a second embodiment of operation of a network-security monitoring platform, where the platform computes a value of variance.

Consequently, FIG. 3 shows a second embodiment of operation of the computer 40*a*.

Also in this case, the computer 40*a* is configured to obtain the metadata MD of a data packet DP. For the corresponding description reference may be made to the description of steps 1002 and 1004 of FIG. 2.

In the embodiment considered, a step 1022 is moreover represented, in which the computer 40*a* analyses the metadata MD to determine whether the data packet DP belongs to one or more communication sequences to be monitored, i.e., whether the metadata MD correspond to one or more rules. In fact, as explained previously, one and the same data packet DP could satisfy a number of rules that are associated to different communication sequences, for example:

- for monitoring a LAN scan, requests having the same source and the same destination port but having different destinations; and
- for monitoring a port scan, requests having the same source and different destination ports but having the same destination.

In fact, as described previously, the computer 40*a* should calculate for each communication sequence to be monitored a respective value of variance. For example, to distinguish the various communication sequences, the computer 40*a* may be configured for associating to each sequence a respective univocal code.

In particular, in the embodiment considered, the steps 1006, 1008 and 1010 have been combined in a single procedure of calculation of the variance for a given communication. Consequently, in the case where the data packet DP belongs to a number of sequences to be monitored, the procedure 1024 is carried out for each sequence. For example, to identify the sequence to which the data packet DP belongs, the computer 40*a* may pass, to the procedure 1024, also the univocal code that identifies a given communication sequence.

In particular, in various embodiments, the computer 40*a* is configured for updating the value of variance Var for a given sequence (for example, identified via a respective univocal code) in an iterative way as a function of the timestamp t of the current data packet DP that is being analysed.

Consequently, also in this case, the computer 40*a* may proceed to a step 1012 for comparing the value or values of variance Var that has/have been updated with respective thresholds TH, i.e., the respective threshold TH associated to the communication sequence that is being updated, and possibly may generate a notification signal in step 1014.

Figure 4:
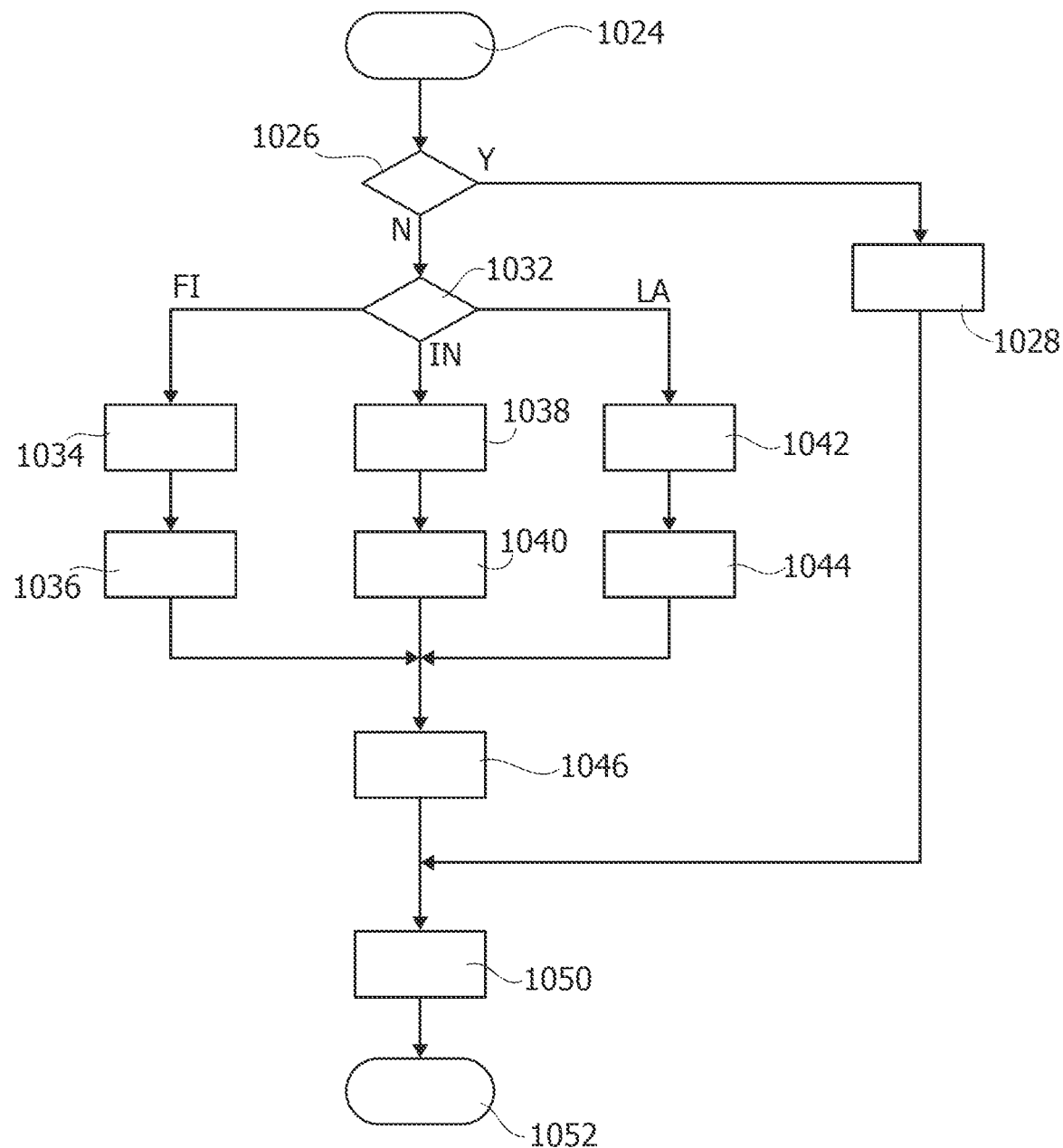

FIG. 4 shows an embodiment of the procedure 1024.

As explained previously, in various embodiments, the computer 40*a* is configured for updating the value of variance Var for a given sequence (for example, identified via a respective univocal code) in an iterative way as a function of the timestamp t of the current data packet DP that is being analysed.

Specifically, in various embodiments, the variance is calculated using the following simplified equation:

$$\text{Var}(S) = \frac{1}{n-1}\sum_{i=0}^{n-2}s_i^2 - \left(\frac{1}{n-1}\sum_{i=0}^{n-2}s_i\right)^2$$

which enables separate calculation of a partial sum $$s_{sp} = \sum_{i=0}^{n-2}s_i$$

and a quadratic sum $$s_{sq} = \sum_{i=0}^{n-2}s_i^2$$

In this context, the times t of the data packets DP are not necessarily in order. For example, considering the following sequence V of times of arrival t (expressed for simplicity in milliseconds) of data packets DP of a given communication sequence:

V=[251, 450, 678, 553, 660, 719, 824, 876, 602, 184]
the corresponding orderly sequence T would be:
T=[184, 251, 450, 553, 602, 660, 678, 719, 824, 876]
Instead, the corresponding sequence S would be:
S=[67, 199, 103, 49, 58, 18, 41, 105, 52]

In particular, in various embodiments, to manage sequential entry of a new element t, the computer 40*a* may manage a list D:

D:=[$d_0$, $d_1$ ... ]=[[$t_0$,0],[$t_1$,$s_0$], ... ]

In general, instead of managing a single list D, the computer 40*a* could also manage one list T (for the times t) and one list S (for the differences s). However, this case is not considered specifically hereinafter, since it is only a question of a separation of the elements of the list D into two lists T and S.

Instead, as will be described in greater detail hereinafter, in various embodiments, the computer 40*a* may not store the differences s in the list D (or S), but only the times t in the list D. In this case, the list D hence corresponds to the list T.

Consequently, in the embodiment considered, after the step 1024 of start of the procedure, the computer 40*a* checks in a step 1026 whether the procedure has been started for the first time for the communication sequence that is being updated, for example whether the procedure has been started for the first time for a given univocal code. For instance, the computer 40*a* may check in step 1026 whether the respective list D (or likewise the list T) is empty and/or has a number of elements k equal to zero.

Figure 6A:
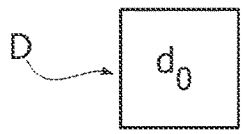

In the case where the procedure has been started for the first time (output "Y" from the verification step 1026), the computer 40*a* proceeds to an initialization step 1028, in which it initializes the list D or the list T, in particular by adding the first element:

D:=[$d_0$]=[[t, 0]] or T:=[$t_0$]=[t]

i.e., the time t is stored as the first element $d_0$ of the list D or likewise the first element $t_0$ of the list T. For example, this is schematically shown in FIG. 6A, where the list D comprises only the element $d_0$. Moreover, the computer 40*a* sets the values of the partial sum $s_{sp}$(i), of the quadratic sum $s_{sq}$(i) and of a variable Var(i) for the current instant (i=0) to zero.

In the embodiment considered, the computer 40*a* then proceeds to a step 1050, in which it increments the counter k, which hence indirectly indicates also the number of iterations i, that is, the number of the elements in the list D (or likewise T) at the next iteration. In general, the number of elements in the list D (or likewise T) could be obtained also by analysing explicitly the content of the list.

Finally, the procedure terminates in a step 1052. Consequently, with reference to the numeric example, the computer 40a adds at the first iteration (i=0) the first element $d_0=[251, 0]$ to the list D, as shown in FIG. 5.

Instead, in the case where the procedure has been started not for the first time (output "N" from the verification step 1026), the computer 40a proceeds to a verification step 1032, in which it determines whether:

the timestamp received t is less than the timestamp $t_0$ of the first element of the list, i.e., $t<t_0$; and the timestamp received t is greater than the timestamp $t_{k-1}$ of the last element of the list, i.e., $t>t_{k-1}$.

In the case where the current timestamp t received is greater than the timestamp $t_{k-1}$ of the last element of the list (output "LA" from the verification step 1032), the computer 40a updates in a step 1034 the list D (or likewise the list T) by adding a new element at the end of the list D or of the list T. The lists updated during a given iteration are denoted hereinafter, respectively, as D' or as T', where:

$D'=[d'_0, \ldots ]=[[6,0], \ldots ], or T''=[t'_0, \ldots ]$.

The above list D' (or likewise the list T') does not correspond to a new list as compared to the list D (or likewise to the list T). In fact, at the next iteration the list D (or T) corresponds to the updated list D' (or r) of the previous iteration, i.e., D(i)=D'(i−1) or T(i)=T'(i−1).

Figure 6B:
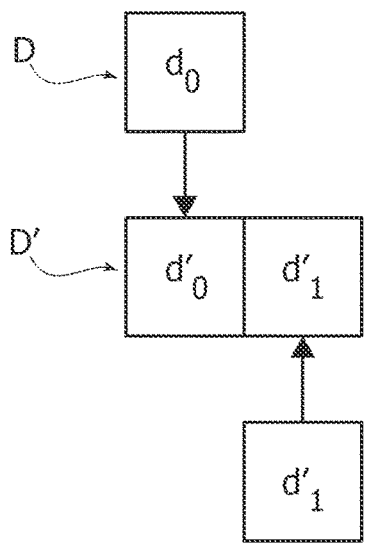
Figure 6C:
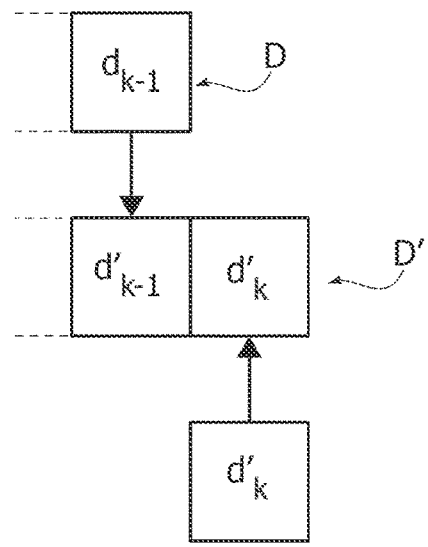

For example, as shown in FIG. 6B, in the case where the list D comprises only the element $d_0$, i.e., k=1, the updated list D' comprises two elements $[d'_0, d'_1]$, with $d'_0=d_0$ and $d'_1=[t'_1, s'_{k-1}]=[t, t-t_0]$. Instead, as shown in FIG. 6C with reference to a generic list D with k elements, i.e., $D=[d_0, \ldots d_{k-1}]$, the updated list D' corresponds to:

$D'=[d_0, \ldots d_{k-1}, d'k]$ where the new element d'k can be calculated as:

$d'_k=[t'_k, s'_{k-1}]=[t, t-t_{k-1}]$

For instance, with reference to the numeric example, the computer 40a adds, at the second iteration (with i=1), the element $d'_1=[450, 199]$ at the end of the list D.

Likewise, the computer 40a could then add, at the end of the list T, a new element $t'_k=t$. However, also in this case, the computer 40a computes the value $s'_{k-1}=t-t_{k-1}$, i.e., the difference between the sending time t and the sending time $t_{k-1}$ of the last element of the list T.

Next, the computer 40a computes, in a step 1044, the values of the partial sum $s_{sp}(i)$ and of the quadratic sum $s_{sq}(i)$ of the current iteration (i), updating respectively the values of the partial sum $s_{sp}(i-1)$ and of the quadratic sum $s_{sq}(i-1)$ of the previous iteration (i−1) by adding, respectively, the value $s'_{k-1}$ and the square of the value $s'_{k-1}$:

$$s_{sp}(i)=s_{sp}(i-1)+s'_{j-1}(i)$$

$$s_{sq}(i)=s_{sq}(i-1)+s'_{j-1}(i)^2$$

Consequently, with reference to the numeric example, the computer 40a updates the value $s_{sp}$ to 199 and the value $s_{sq}$ to 39,601.

Next, the computer 40a updates, in a step 1046, the value of the variable/variance Var(i) at the iteration (i) by applying the following equation:

$$\mathrm{Var}(i) = \frac{1}{k}s_{sq}(i) - \left(\frac{1}{k}s_{sp}(i)\right)^2$$

which in any case yields, at the second iteration i=1, once again Var(1)=0, since $s_{sq}(1)=s_{sp}(1)^2$. In general, in this equation, the number k refers to the number of differences s that are taken into account, which corresponds to the number of elements of the (non-updated) list D.

In the embodiment considered, the computer 40a then proceeds to step 1050 for updating the value k of the elements in the list D (or likewise in the list T) for the next iteration. Consequently, in the case where the updated number k' is used, which hence indicates the number of elements of the updated list D', the equation used in step 1046 corresponds to:

$$\mathrm{Var}(i) = \frac{1}{k'-1}s_{sq}(i) - \left(\frac{1}{k'-1}s_{sp}(i)\right)^2$$

Likewise, the computer 40a, at the third iteration (with i=2), adds at the end of the list D the element $d_2=[678, 228]$, and updates the value $s_{sp}(2)$ to 427 and the value $s_{sq}(2)$ to 91,585, in this case updating also the variable Var(2) to 210.25.

Instead, in the case where the current time t received is less than the time $t_0$ of the first element of the list (output "FI" from the verification step 1032), the computer 40a adds, in a step 1034, a new element at the beginning of the list D, or likewise at the beginning of the list T, i.e., $d'_0=[t, 0]$, or $t'_0=t$ Consequently, in this way the other elements of the list are shifted. However, in this case, it is necessary to update the value of difference s of the old first element $d_0$, which is now in the position of the new second element $d'_1$ of the updated list D'. Consequently, in various embodiments, the computer 40a recalculates the value of the difference of the second element $d'_1$ as a function of the timestamp $t'_1$ of the new second element $d'_1$ (which corresponds to the timestamp $t_0$ of the old first element $d_0$) and of the timestamp $t'_0$ of the new first element (which corresponds to the timestamp t)

$d'_1=[t'_1, s'_0]=[t_0, t_0-t]$

Figure 6D:
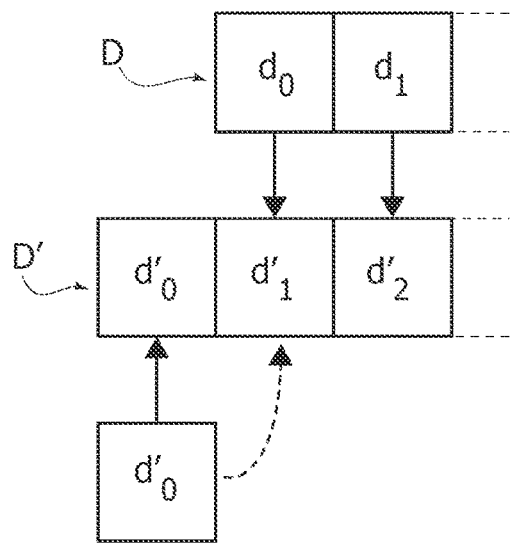

In general, updating can be carried out for the element $d_0$, i.e., prior to entry of the element $d'_0$, or of the element $d'_1$, i.e., after entry of the element $d'_0$. Consequently, for a generic list D with k elements, the updated list D' corresponds to $D'=[d'_0, d'_1, d_1, \ldots d_{k-1}]$ For example, this is shown in FIG. 6D, where the computer 40a adds the element $d'_0$ to the list, recalculates the differences $s'_0$ of the element $d'_1$ as a function of the times of the elements $d_0$ and $d'_0$, and maintains the subsequent elements $d_1, \ldots d_{k-1}$ as elements $d'_2, \ldots d'_k$. Likewise, in FIG. 5, the time t=184 is added at the iteration i=9 as first element $d'_0=[184, 0]$, shifting the other elements. Moreover, the computer 40a updates the value of the new second element from $d_0=[251, 0]$ to $d'_1=[251, 67]$.

Likewise, the computer 40a could then add at the start of the list T a new element $t'_0=t$. However, also in this case, the computer 40a computes the value $s'_0=t_0-t$, i.e., the difference between the sending time $t_0$ of the first element of the (non-updated) list D and the sending time t.

Next, the computer 40a computes, in a step 1036, the values of the partial sum $s_{sp}(i)$ and of the quadratic sum $s_{sq}(i)$ of the current iteration (i), updating respectively the values of the partial sum $s_{sp}(i-1)$ and of the quadratic sum $s_{sq}(i-1)$ of the previous iteration (i−1). In particular, in this case, the computer 40a adds, respectively, the value $s'_0$ and the square of the value $s'_0$:

$$s_{sp}(i)=s_{sp}(i-1)+s'_0(i)$$

$$s_{sq}(i)=s_{sq}(i-1)+s'_0(i)^2$$

Consequently, with reference to the numeric example, the computer 40a updates, at the instant i=9, the value $s_{sp}$ from 625 to 692 and the value $s_{sq}$ from 71,709 to 76,198. Next, the computer 40a again updates, in step 1046, the value of the variable/variance Var(i) at the iteration (i) from 2860.11 to 2554.54.

Finally, in the case where the current timestamp t received is greater than the timestamp $t_0$ of the first element of the list and less than the timestamp $t_{k-1}$ of the last element of the list (output "IN" from the verification step 1032), the computer determines a position j in the list D (or likewise the list T) in which the element t is to be inserted. In particular, the position j corresponds to the position between two consecutive elements in the list D (or T) that have, respectively, a timestamp less than and a timestamp greater than the current value of t, namely, $t_{j-1} \leq t \leq t_j$, i.e., j: $t_j=\min(t^*)$ with $t^* \geq t$.

Figure 6E:
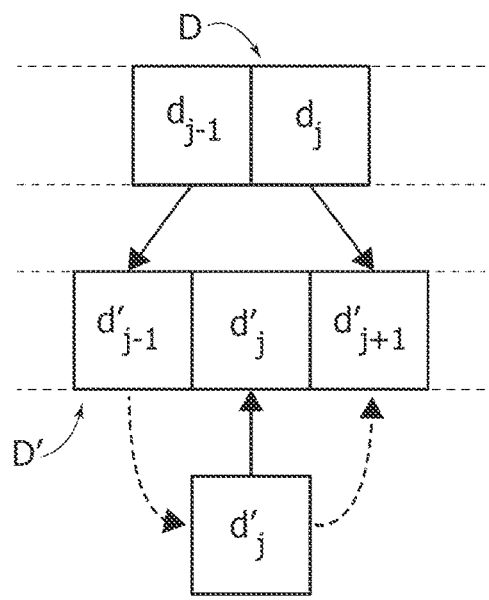

Consequently, as also shown in FIG. 6E, the computer 40a adds, in a step 1038, a new element $d'_j$ in position j of the list D. In particular, the above element comprises the timestamp t and the difference with respect to the previous element $d_{j-1}$, namely, $$d'_j=[t'_j, s'_j]=[t, t-t_{j-1}]$$

The subsequent elements of the list D are consequently in turn shifted. Also in this case, it is necessary to update the value of difference s of the old element $d_j$ in position j, which now corresponds to the element $d'_{j+1}$ in position (j+1) of the list D', namely, $$d'_{j+1}, [t'_{j+1}, s'_j]=[t_j-t]$$

In general, updating may be carried out for the element $d_j$, i.e., prior to entry of the element $d'_j$, or for the element $d'_{j+1}$, i.e., after entry of the element $d'_j$.

For example, this is shown in FIG. 5, where the time t=602 is added at the iteration i=8 after the element [553, 103] as element $d'_3=[602, 49]$, thus shifting the other elements. Moreover, the computer 40a updates the value of the old element $d_3$ to $d'_4=[660, 58]$.

Likewise, the computer 40a may then add in position j of the list T a new element $t'_j=t$. However, also in this case, the computer 40a computes the following values:

$s'_j=t_j-t$, i.e., the difference between the sending time $t_j$ of the element in position j and the timestamp t, and $s'_{j-1}=t-t_{j-1}$, i.e., the difference between the timestamp t and the sending time $t_{j-1}$ of the element of the orderly list D in position (j-1).

Moreover, the computer determines the value $s_{j-1}=t_j-t_{j-1}=t'_{j+1}-t'_{j-1}$, i.e., the difference between the sending time $t_j$ of the element $d_j$ of the (non-updated) list D in position j and the sending time $t_{j-1}$ of the element $d_{j-1}$ of the (non-updated) list D in position (j-1). In particular, using the list D, the aforesaid value is saved for the (non-updated) element $d_j=[t_j, s_{j-1}]$ and may thus be read before the element $d_j$ is updated as element $d'i_{j+1}$. Instead, using the list T, the aforesaid value $s_{j-1}$ may be calculated. In general, this calculation may be made for the elements $t_j$ and $t_{j-1}$, i.e., prior to entry of the element $t'_j$, or for the elements $t'_{j+1}$ and $t'_{j-1}$, i.e., after entry of the element $t'_j$.

Next, the computer 40a computes, in a step 1040, the values of the partial sum $s_{sp}(i)$ and of the quadratic sum $s_{sq}(i)$ of the current iteration (i), updating, respectively, the values of the partial sum $s_{sp}(i-1)$ and of the quadratic sum $s_{sq}(i-1)$ of the previous iteration (i-1). In particular, considering the entry of the new element $d'_j(t'_j)$, the computer 40a is configured for adding respectively the (new) difference $s'_{j-1}$ or the square of the difference $s'_{j-1}^2$. In addition, considering updating of the element $d_j/d'_{j+1}(t_j/t'_{j+1})$, the computer 40a is configured for adding respectively the (new) difference $s'_j$ or the square of the difference $s'_j{}^2$, and removing respectively the old difference $s_{j-1}$ or the square of the difference $s_{j-1}^2$; i.e., the computer 40a implements the following equations:

$$s_{sp}(i)=s_{sp}(i-1)+s'_{j-1}(i)+s'_j(i)-s_{j-1}(i)$$

$$s_{sq}(i)=s_{sq}(i-1)+s'_{j-1}(i)^2+s'_j(i)^2-s_{j-1}(i)^2$$

In particular, since $s'_j+s'_{j-1}=s_{j-1}$, in various embodiments, the computer 40a uses the following formula for the partial sum $s_{sp}$:

$$s_{sp}(i)=s_{sp}(i-1)$$

Consequently, the computer 40a may even not update the partial sum $s_{sp}$ when an intermediate element is inserted in the list. In fact, the value $s_{sp}$ corresponds to the difference between the time t'k of the last element of the updated list D' (or T) and the time $t'_0$ of the first element of the updated list D' (or T), i.e., $s_{sp}=t'k-t'_0$. Consequently, in various embodiments, instead of using the iterative scheme, the computer 40a may compute the above difference between the maximum value and the minimum value also directly on the basis of these values.

Next, the computer 40a proceeds to step 1046 for updating the value of the variable/variance Var(i) at the iteration (i).

Consequently, in the considered embodiment, the computer 40a adds the timestamps t in an orderly way in the list D (or likewise 7) and possibly updates accordingly the differences s in the list D. Furthermore, the computer 40a corrects also the values of the partial sum $s_{sp}(i)$ and of the quadratic sum $s_{sq}(i)$ of the current iteration (i), taking into account any possible shifts between the elements.

Consequently, the performance depends not so much upon recalculation of the values of the partial sum $s_{sp}(i)$, of the quadratic sum $s_{sq}(i)$, and of the variance Var(i), as upon the time required for finding the correct position (0, j or k) for inserting an element t in the list. For example, since new elements are likely to be inserted for the most part at the end of a list D (or T), in various embodiments, the search for the position j in step 1038 is carried out starting from the end of the list D (or T). For example, for this purpose, the list D (or T) may be implemented with a list that comprises for each element d (or t) a pointer to the previous element (the so-called reverse-linked list), or pointers to the previous element and to the next element (the so-called doubly-linked list). For instance, for a description of the connection between the elements of a list by means of pointers reference may be made to https://en.wikipedia.org/wiki/Linked_list.

Of course, without prejudice to the principles underlying the invention, the details of construction and the embodiments may vary widely with respect to what has been described and illustrated herein purely to way of example, without thereby departing from the scope of the present invention, as defined in the ensuing claims.

The invention claimed is:

1. A method of detecting systematic communications in a communication network, wherein the method comprises repeating the following steps for each data packet (DP) of a sequence of a plurality of data packets (DP) transmitted via said communication network from a respective source to a respective target:
   obtaining metadata (MD) for said data packet (DP), wherein said metadata (MD) include data which identify said source and/or said target, and data which identify a transmission time (t) where said data packet (DP) has been sent;
   verifying whether said data packet (DP) belongs to a given type of communication by verifying whether said metadata (MD) indicate that said data packet (DP) has been sent by a given source and/or has been received by a given target, and in case said metadata (MD) indicate that said data packet (DP) has been sent by a given source and/or has been received by a given target, computing a variance value Var for said given type of communication;

comparing said variance value Var with a threshold (TH), and in case said variance value Var is smaller than said threshold, generating a notification which indicates that said given type of communication is systematic;

wherein said computing said variance value Var for said given type of communication comprises:

verifying whether an ordered list (D) is empty, in case said ordered list (D) is empty, adding said transmission time (t) as first element ($d_0$) to said ordered list (D), and setting a sum of squares value $s_{sq}$ to zero, in case said ordered list (D) is not empty, comparing said transmission time (t) with the transmission times stored in said ordered list (D), and in case said transmission time (t) is greater than the transmission time of the last element ($d_{k-1}$) in said ordered list (D):
  a) computing the difference between said transmission time (t) and the transmission time of the last element ($d_{k-1}$) of said ordered list (D),
  b) updating said ordered list (D') by adding said transmission time (t) as new last element ($d'_k$) to the end of said ordered list (D), and
  c) updating said sum of squares value $s_{sq}$ by adding the square of said difference;

in case said transmission time (t) is smaller than the transmission time of the first element in said ordered list (D):
  a) computing the difference between the transmission time of the first element ($d_0$) of said ordered list (D) and said transmission time (t),
  b) updating said ordered list (D') by adding said transmission time (t) as new first element ($d'_0$) at the beginning of said ordered list (D), and
  c) updating said sum of squares value $s_{sq}$ by adding the square of said difference;

in case said transmission time (t) is greater than the transmission time of the first element ($d_0$) in said ordered list (D) and smaller than the transmission time of the last element ($d_{k-1}$) in said ordered list (D):
  a) determining a position (j) for inserting said transmission time (t), wherein said position corresponds to the position (j) of the element ($d_j$) of said ordered list (D) which has a transmission time being greater than said transmission time (t) and follows the position of the immediately preceding element ($d_{j-1}$) of said ordered list (D) which has a transmission time being smaller than said transmission time (t),
  b) computing a first difference between the transmission time of the element ($d_j$) of said ordered list (D) in said position (j) and said transmission time (t), computing a second difference between said transmission time (t) and the transmission time of the element ($d_{j-1}$) of said ordered list (D) in the position which precedes said position (j), and determining a third difference between the transmission time of the element ($d_j$) of said ordered list (D) in said position (j) and the transmission time of the element ($d_{j-1}$) of said ordered list (D) in the position which precedes said position (j),
  c) updating said ordered list (D') by adding said transmission time (t) as new element ($d'_j$) in said position (j) of said ordered list (D), and
  d) updating said sum of squares value $s_{sq}$ by adding the square of said first difference and the square of said second difference, and subtracting the square of said third difference; and determining a value k identifying the number of elements in said ordered list (D);

determining a difference $s_{sp}$ between the transmission time of the last element ($d'_k$) of said updated ordered list (D') and the transmission time of the first element ($d'_0$) of said updated ordered list (D'); and computing said variance value Var with the following equation:

$$\mathrm{Var} = \frac{1}{k} s_{sq} - \left(\frac{1}{k} s_{sp}\right)^2.$$

2. The method according to claim 1, wherein said determining a third difference between the transmission time of the element ($d_j$) of said ordered list (D) in said position (j) and the transmission time of the element ($d_{j-1}$) of said ordered list (D) in the position which precedes said position (j) comprises:

in case said transmission time (t) is greater than the transmission time of the last element ($d_{k-1}$) in said ordered list (D):
  storing said difference between said transmission time (t) and the transmission time of the last element ($d_{k-1}$) of said ordered list (D) within said new last element ($d'_k$) of said updated ordered list (D');

in case said transmission time (t) is smaller than the transmission time of the first element ($d_0$) in said ordered list (D):
  storing said difference between the transmission time of the first element ($d_0$) of said ordered list (D) and said transmission time (t) as difference of the old first element ($d_0$; $d'_1$) of said ordered list (D); and in case said transmission time (t) is greater than the transmission time of the first element ($d_0$) in said ordered list (D) and smaller than the transmission time of the last element ($d_{k-1}$) in said ordered list (D):
  obtaining said third difference by reading the difference stored within the element ($d_j$) of said ordered list (D) at said position (j), and
  storing said second difference within the new element ($d'_j$) of said updated ordered list (D') in said position (j), and storing said first difference as difference of the old element ($d_j$; d'j+1) of said ordered list (D) in said position (j).

3. The method according to claim 1, wherein said determining a third difference between the transmission time of the element ($d_j$) of said ordered list (D) in said position (j) and the transmission time of the element ($d_{j-1}$) of said ordered list (D) in the position which precedes said position (j) comprises:

obtaining said third difference by computing the difference between the transmission time stored in the element ($d_j$) of said ordered list (D) in said position (j) and the transmission time stored in the element ($d_{j-1}$) of said ordered list (D) in the position which precedes said position (j).

4. The method according to claim 1, wherein said determining a difference $s_{sp}$ between the transmission time of the last element ($d'_k$) of said updated ordered list (D') and the transmission time of the first element ($d'_0$) of said updated ordered list (D') comprises:
in case said ordered list (D) is empty, setting a partial sum value $s_{sp}$ to zero,
in case said transmission time (t) is greater than the transmission time of the last element ($d_{k-1}$) in said ordered list (D):
updating said partial sum value $s_{sp}$ by adding said difference between said transmission time (t) and the transmission time of the last element ($d_{k-1}$) of said ordered list (D);
in case said transmission time (t) is smaller than the transmission time of the first element ($d_0$) in said ordered list (D):
updating said partial sum value $s_{sp}$ by adding said difference between the transmission time of the first element ($d_0$) of said ordered list (D) and said transmission time (t).

5. The method according to claim 1, comprising storing one or more variance values Var each time deleting the elements of said ordered list (D), and determining said threshold (TH) as a function of said one or more variance values Var.

6. The method according to claim 5, wherein said threshold (TH) is determined via a statistical analysis or a machine learning algorithm configured to analyze said one or more variance values Var.

7. The method according to claim 1, wherein said data packets (DP) are data packets of the TCP/IP or UDP/IP protocol, wherein said data packet (DP) comprise a source IP address, a target IP address and a target port, and wherein said verifying whether said data packet (DP) belongs to a specific type of communication comprises verifying whether said metadata (MD) indicate that said data packet (DP):
has been sent from a given source IP address to a given target IP address; or
has been sent from a given source IP address to a given target port.

8. The method according to claim 1, wherein said data packets (DP) are Ethernet data packets comprising data packets of the IP protocol, wherein said data packets (DP) comprise a source MAC address and a source IP address, and wherein said verifying whether said data packet (DP) belongs to a specific type of communication comprises verifying whether said metadata (MD) indicate that said data packet (DP):
is an Address Resolution Protocol request sent from a given source MAC address and/or a given source IP address; or
is an "echo" request of the Internet Control Message Protocol sent from a given source MAC address and/or a given source IP address.

9. A device configured to implement the method according to claim 1.

10. A computer-program product that can be loaded into non-transitory memory that is coupled to at least one processor, wherein the computer program comprises software code that, when executed by said at least one processor, implements operations comprising: the method according to claim 1.

* * * * *